United States Patent [19]
Bruning

[11] Patent Number: 5,991,035
[45] Date of Patent: Nov. 23, 1999

[54] INTERFEROMETRIC METHOD OF MEASURING TORIC SURFACES AT GRAZING INCIDENCE

[75] Inventor: John H. Bruning, Pittsford, N.Y.

[73] Assignee: Tropel Corporation, Fairport, N.Y.

[21] Appl. No.: 09/246,641

[22] Filed: Feb. 8, 1999

Related U.S. Application Data

[62] Division of application No. 08/733,705, Oct. 17, 1996, Pat. No. 5,889,591.

[51] Int. Cl.$^6$ .................................................. G01B 9/02
[52] U.S. Cl. .......................................... 356/359; 356/354
[58] Field of Search ................................... 356/345, 354, 356/359, 360

[56] References Cited

U.S. PATENT DOCUMENTS

| | | | |
|---|---|---|---|
| 4,653,922 | 3/1987 | Jarisch et al. ........................... | 356/357 |
| 4,678,333 | 7/1987 | Anderson ................................ | 356/346 |
| 4,791,584 | 12/1988 | Greivenkamp, Jr. . | |
| 4,844,614 | 7/1989 | Henderson et al. . | |
| 5,210,591 | 5/1993 | De Groot ................................ | 356/357 |
| 5,249,032 | 9/1993 | Matsui et al. ........................... | 356/356 |
| 5,268,742 | 12/1993 | Magner . | |
| 5,530,547 | 6/1996 | Arnold . | |

FOREIGN PATENT DOCUMENTS

| | | |
|---|---|---|
| 0179935 | 5/1986 | European Pat. Off. . |
| 0106769 | 7/1974 | Germany . |
| 0233644 | 3/1986 | Germany . |
| 62-177421 | 1/1987 | Japan . |
| 4221704 | 12/1992 | Japan . |
| 4286904 | 12/1992 | Japan . |

OTHER PUBLICATIONS

"Holographically Observed Torsion in a Cylindrical Shaft" by A.D. Wilson, Applied Optics, vol. 9, No. 9, Sep. 1970, pp. 2093–2097.

"Obligue Incidence Interferometry applied to Non–Optical Surfaces" by K. G. Birch, Journal of Physics E: Scientific Instruments, 1973, vol. 6, Great Britain, pp. 1045–1048.

"Measurement of Deformation in a Cylindrical Shell by Holographic Interferometry" by T. Matsumoto, K. Iwata, and R. Nagata, Applied Optics, vol. 13, No. 5, May 1974, pp. 1080–1084.

"Zone Plate Interferometer" by Raymond N. Smart, May 1974, vol. 13, No. 5, Applied Optics, pp. 1093–1099.

"Improved Obligue—Incidence Interferometer" by P. Hariharan, Optical Engineering, vol. 14, No. 3, May–Jun. 1975, pp. 257–258.

"Holographic Interferometer to Test Optical Surfaces" by Fernando Broder–Bursztyn and Daniel Malacara–Hernandez, Applied Optics, vol. 14, No. 9, Sep. 1975, pp. 2280–2282.

"Interferometric Surface Mapping with Variable Sensitivity" by W. Jaerisch and G. Makosch, Applied Optics, vol. 17, No. 5, Mar. 1, 1978, pp. 740–743.

"Interferometric Construction of Circular Gratings" by E. Leith, H. Chen, G. Collins, K. Scholten, G. Swanson, and J. Upatnicks, Applied Optics, vol. 19, No. 21, Nov. 1, 1980, pp. 3626–3630.

"Optical Figure Characterization for Cylindrical Mirrors and Lenses" by Alvin D. Schnurr and Allen Mann, Optical Engineering, vol. 20, No. 3, May/Jun. 1981, pp. 412–416.

(List continued on next page.)

*Primary Examiner*—Robert H. Kim
*Attorney, Agent, or Firm*—Eugene Stephens & Associates

[57] ABSTRACT

Toric surfaces are mounted on a transparent support plate and measured at grazing incidence using a pair of leading and following diffractive optics for diffracting a test beam with respect to a reference beam. The leading diffractive optic diffracts rays of the test beam through various diffraction angles so that after passing through the transparent support plate, the rays strike the toric surface at a constant grazing angle. The following diffractive optic further diffracts the rays of the test beam through other diffraction angles into realignment with the reference beam.

9 Claims, 5 Drawing Sheets

OTHER PUBLICATIONS

"Cylindrical Lenses: Testing and Radius of Curvature Measurement" by R. Diaz–Uride, J. Pediraza–Centreras, O. Cardona–Nunez, A. Cordero Davilla, and A. Connejo Rodriquez, Applied Optics, vol. 25, No. 10, May 15, 1986, pp. 1707–1709.

"Testing Cylindrical Lenses" by Joseph M. Geary, Optical Engineering, vol. 26, No. 12, Dec. 1987, pp. 1219–1224.

"Data Analysis in Fiber Optic Testing of Cylindrical Optics" by Joseph M. Geary, Optical Engineering, Mar. 1989. vol. 28, No. 3, pp. 212–216.

"Interferometry on Wolter X–ray Optics : A Possible Approach" by Joseph M. Geary, Optical Engineering, vol. 28, No. 3, Mar. 1989, pp. 217–221.

"Constant Radial Shearing Interferometry with Circular Gratings" by Qing–Shin Ru, Nagaaki Ohyama, Toshio Honda, and Jumpei Tsujiuchi, Applied Optics, vol. 28, No. 15, Aug. 15, 1989, pp. 3350–3353.

"Profile measurement of an Aspheric Cylindrical Surface from Retroreflection" by Ong–tin Lin and Der–Shen Wan, Applied Optics, vol. 30, No. 22, Aug. 1 1991, pp. 3200–3204.

"Profile Measurements of Cylindrical Surfaces" by Der–Shen Wan and Ding–tin Lin, Applied Optics, vol. 32, No. 7, Mar. 1, 1993, pp. 1060–1064.

"Determination of Two–Dimensional Planer displacement by Moijo Fringes of Concentric–Circle Gratings" by Yoon–Chang Park and Seung–Woo Kim, Applied Optics, vol. 33, No. 22, Aug. 1, 1994, pp. 5171–5176.

"Grazing Incidence Interferometry Applied to the Measurement of Cylindrical Surfaces" by T. Dressel, J. Schwider, A. Wehrhahn, and S. Babin Optical Engineering, Dec. 1995, vol. 34, No. 12, pp. 3531–3535.

"Grating Interferometer for Flatness Testing" by Peter J. de Groot, Optics Letters, vol. 21, No. 3, Feb. 1, 1996, pp. 228–230.

5,991,035

INTERFEROMETRIC METHOD OF MEASURING TORIC SURFACES AT GRAZING INCIDENCE

RELATED APPLICATIONS

This application is a Division of allowed parent Application Ser. No. 08/733,705, filed Oct. 17, 1996, Now U.S. Pat. No. 5,889,591 by John H. Bruning, entitled INTERFEROMETRIC MEASUREMENT OF TORIC SURFACES AT GRAZING INCIDENCE, which parent application is hereby incorporated by reference.

TECHNICAL FIELD

Grazing incidence interferometry is used for measuring toric surfaces. Wavefronts impinging on the toric surfaces are shaped by diffractive optics.

BACKGROUND

The measurement of test surfaces by interferometry has generally been limited to planar or spherical surfaces, because test wavefronts matching these surfaces are easy to create. Two wavefronts are normally required—a test wavefront and a reference wavefront. Both start as identical wavefronts, but the test and reference wavefronts take different paths before recombining. Along the path of the test wavefront is the test surface. Any errors in the test surface alter the test wavefront with respect to the reference wavefront, and these differences are apparent in an interference pattern created by the recombined wavefronts.

The test wavefront can be either transmitted or reflected by the test surface to acquire relevant information for comparison. Non-optical test surfaces are measured by reflection, which is usually conducted at normal incidence. The test wavefront is shaped to approach a desired form of the test surface at normal incidence so that any errors in the test surface alter an otherwise retroreflected shape of the test wavefront. Planar surfaces are sometimes measured at grazing incidence in which the test surface folds a planar test waveform along a path independent of a corresponding planar reference wavefront.

Recently, I have been developing the use of diffractive optics for relatively shaping test wavefronts, particularly for measuring non-planar surfaces at grazing incidence. I have been preceded in this endeavor by Dr. Johannes Schwider, who in a 1974 East German Patent No. 106769 first proposed use of two identical diffraction gratings for measuring cylindrical surfaces at grazing incidence. The two gratings are aligned with an axis of the cylindrical surface. The first grating divides a planar primary wavefront into test and reference wavefronts and reshapes the test wavefront into an axiconic form for reflecting from the cylindrical test surface at a constant grazing angle. The reference wavefront passes directly to the second grating without change. The test and reference wavefronts are recombined by the second diffractive optic to produce an interference pattern.

For many years thereafter, little practical exploitation of Dr. Schwider's ideas was achieved. Various practical considerations were left unresolved including setups for actual test objects and further definitions of the gratings to measure other test surfaces. My recent efforts to advance this previously neglected area of technology are documented by a collection of U.S. patent applications, beginning with U.S. application Ser. No. 08/375,499 filed Jan. 19, 1995, which was replaced by U.S. application Ser. No. 08/483,737 filed Jun. 7, 1995, Now U.S. Pat. No. 5,654,798. Another of my applications in which I am named as a co-inventor was filed on Jul. 31, 1995 as U.S. application Ser. No. 08/509,161, Now U.S. Pat. No. 5,793,488. A co-assigned U.S. application Ser. No. 08/631,071 filed Apr. 12, 1996, Now U.S. Pat. No. 5,719,646 further develops this technology. All of these applications are hereby incorporated by reference.

SUMMARY OF INVENTION

This invention builds upon my previous work adapting diffractive optics to the measurement of planar, cylindrical, and conical surfaces by extending the use of such diffractive optics to the measurement of toric surfaces. The new diffractive optics relatively reshape a test beam along a test path for reflecting from the toric surfaces at a constant grazing angle. Diffraction angles vary throughout the diffractive optic to maintain a constant grazing angle along curved portions of the toric surfaces and to compensate for one or more mounting elements that further reshape the test beam.

Toric surfaces, also referred to as toroids, are surfaces of revolution having an arcuate generatrix swept around a central axis. The arcuate generatrix can be a circle or any portion of a circle that extends from one side of the central axis. A sphere is regarded as a special instance of a toroid generated by a circular generatrix having a radius of curvature extending from the central axis.

The new diffractive optics are related to each other and to a toric test surface in a new grazing incidence interferometer. One example includes two specially adapted diffractive optics and a transparent support for the toric test surface. A first diffractive optic divides a primary beam into a test beam and a reference beam and reshapes the test beam into a form different than the reference beam for reflecting over an annular band of the toric test surface at a constant grazing angle. A second diffractive optic further reshapes the test beam reflected from the toric test surface into a form in common with the reference beam and rejoins the test and reference beams into a combined beam. The transparent support, which is preferably a plane-parallel plate, supports the toric test surface and transmits the test beam between the first and second diffractive optics.

Both diffractive optics have respective radii and surface patterns formed by annular paths that are unequally spaced along the radii of the gratings for diffracting the test beam through diffraction angles that vary with the radii of the gratings. In prior designs for measuring planar, cylindrical, or conical surfaces, all of the diffraction angles are equal, so passage of the test beam through transparent supports has little effect on the test beam beyond a small axial adjustment. However, the changing diffraction angles of my new diffractive optics, which are required for maintaining a constant grazing angle over an axially curved portion of the toric test surface, produce differing amounts of refraction within the transparent support plate.

Assuming the two diffractive optics and the support plate are oriented normal to a common optical axis, individual rays of the test beam are offset by passage through the plate by amounts that vary with the angles through which the rays are diffracted. Larger diffraction angles result in larger offsets. The surface pattern of at least one of the new diffractive optics includes further spacing variations between the annular paths required to compensate for refraction of the test beam through the transparent support plate.

The range of diffraction angles through which the test beam is diffracted with respect to the reference beam also requires changes to so-called "phase shifting" techniques, which are used for improving measurement accuracy. Phase shifting involves modulating optical path lengths between test and reference beams to obtain more accurate information concerning their relative phases. My new interferometer accomplishes phase shifting by adjusting axial positions of either diffractive optic or by adjusting the wavelength of the test and reference beams. The amount of adjustment is varied to compensate for the different diffraction angles through which the test beam is relatively diffracted.

DRAWINGS

DETAILED DESCRIPTION

Figure 1:
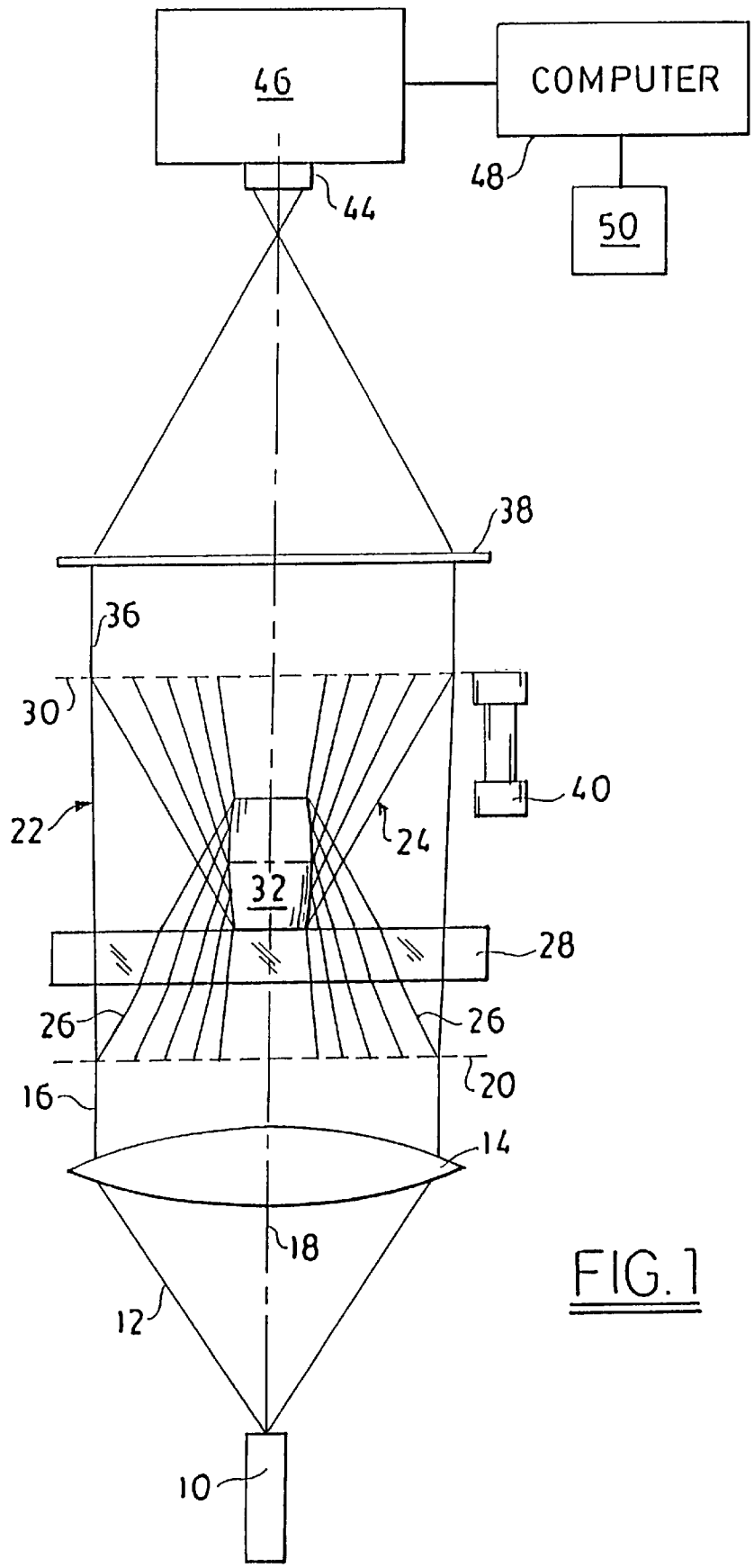
FIG. 1 is a schematic side view of a new interferometer arranged for measuring toric surfaces.

My new interferometer is preferably configured in a Mach-Zender arrangement as schematically depicted in FIG. 1. A light source 10, such as a laser diode or HeNe laser, produces a diverging beam 12 of coherent light. A collimator 14 reshapes the diverging beam into a collimated primary beam 16 having a planar wavefront propagating along reference axis 18.

Figure 2:
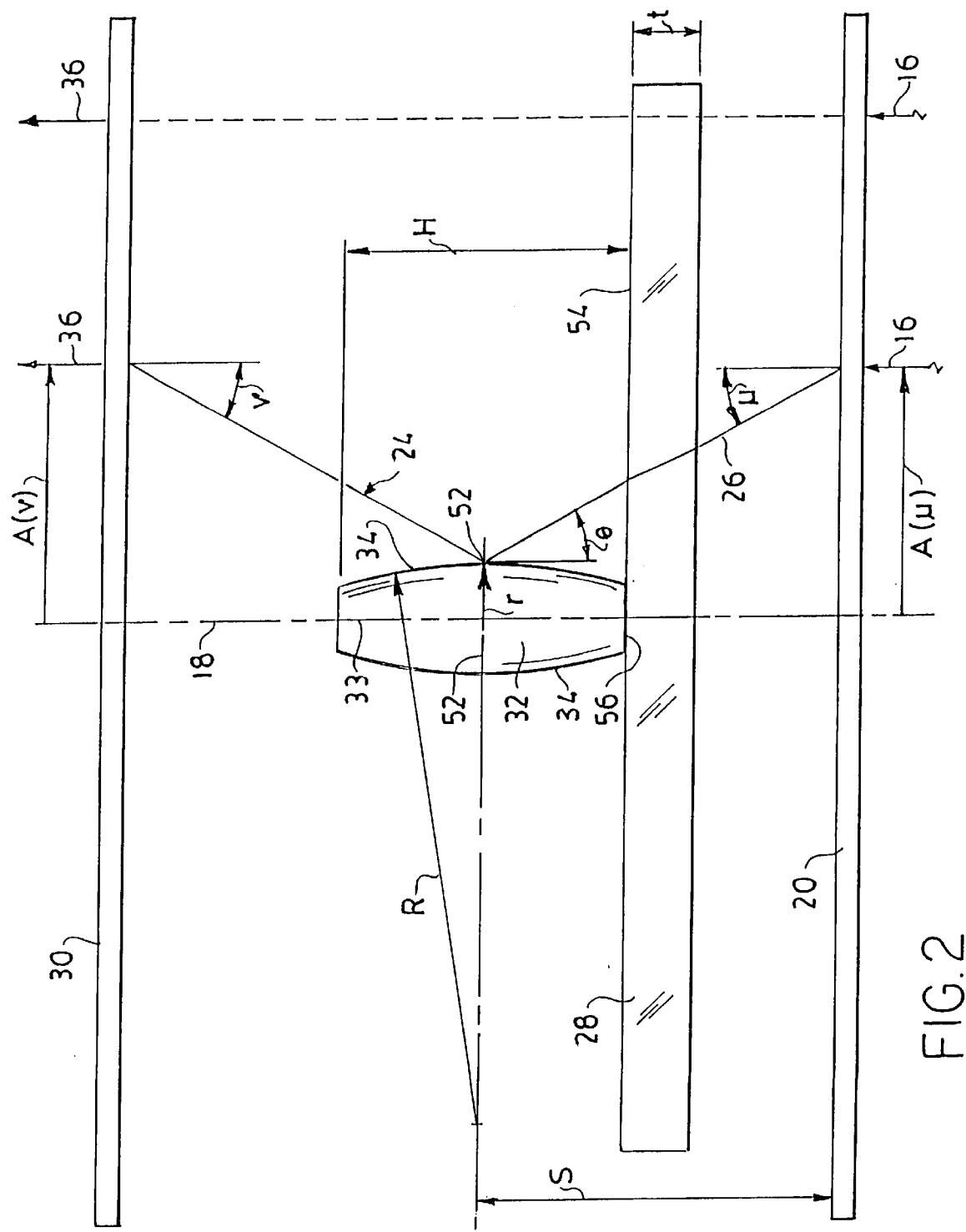
FIG. 2 is an enlarged view of a portion of the interferometer showing one ray of a test beam striking a toric surface near its equator.
Figure 3:
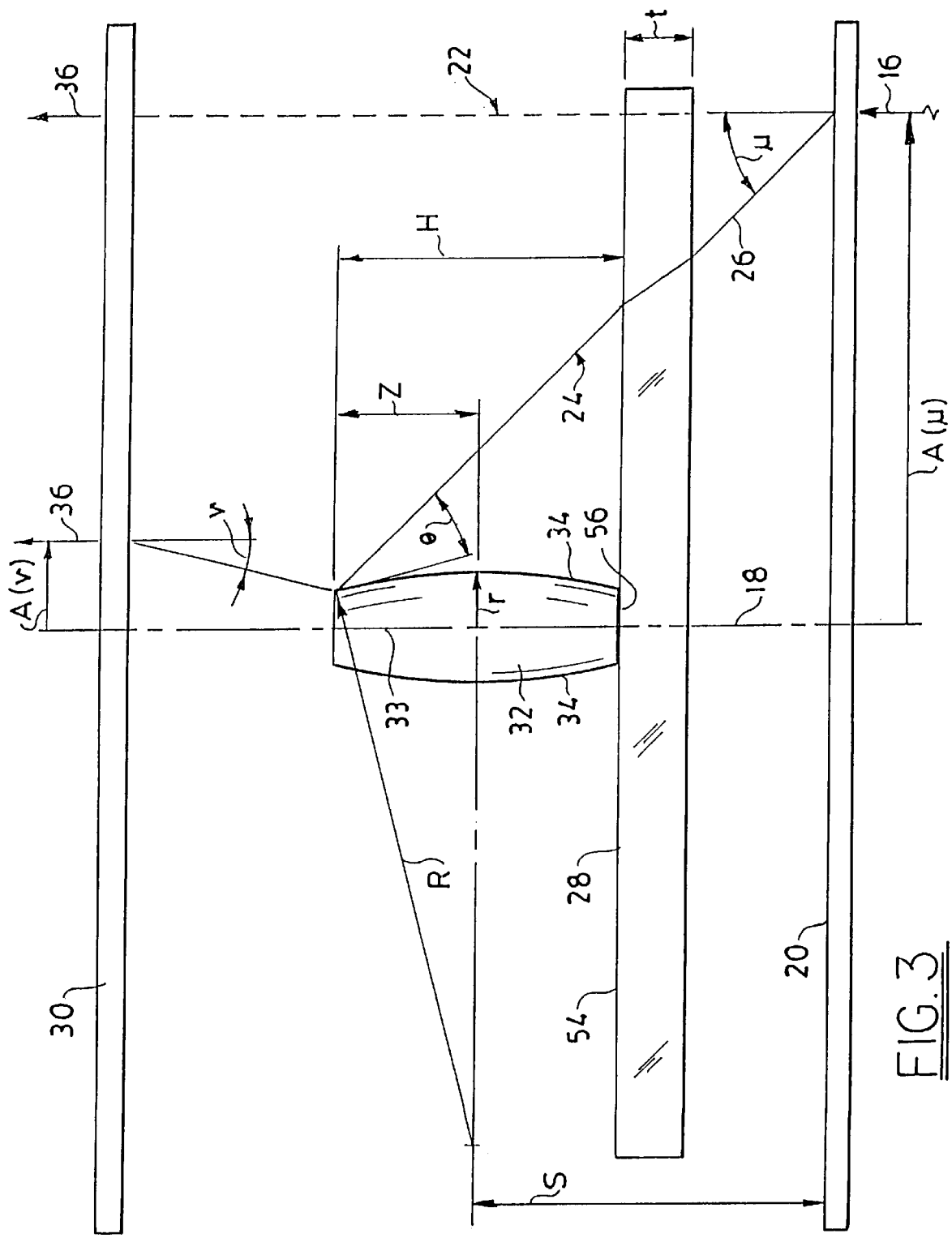
FIG. 3 is a similar enlarged view showing another ray of the test beam striking the toric surface near one end.

A leading diffractive optic 20, such as a circular transmissive diffraction grating or binary optic, divides the primary beam 16 into a reference beam 22 and a test beam 24. The reference beam 22 remains collimated as a planar wavefront. The test beam 24 is reshaped by the leading diffractive optic into a converging beam composed of individual rays 26 that are variously inclined to the reference axis 18 through different diffraction angles "$\mu$". Two such diffraction angles "$\mu$" are shown in FIGS. 2 and 3.

A transparent plane-parallel plate 28 supporting a test object 32 having a toric test surface 34 offsets the individual rays 26 from the reference axis by amounts that increase with the diffraction angles "$\mu$". The offset is caused by refraction through the plate, and the amount of refraction varies with the angle of incidence at which the rays 26 approach the plate 28, which in this example is the same as the diffraction angle "$\mu$". Since the plate 28 is plane parallel, each of the rays 26 exits the plate 28 at the same angle it enters the plate but along a path that is parallel to its path of entry.

Each of these variously inclined rays 26 of the test beam 24 preferably reflects from the toric test surface 34 at a constant grazing angle "$\theta$" to provide uniform reflectivity and sensitivity of measurement among the different rays 26. After reflecting from the toric test surface 34, the test beam 24 is reshaped by a following diffractive optic 30 into a planar form matching the reference beam 22, which passes unchanged through both diffractive optics 20 and 30. Curvature of the toric test surface 34 in an axial plane (e.g., the drawing plane of FIGS. 2 and 3), requires the individual rays 26 of the test beam 24 to be diffracted through differing diffraction angles "$v$" for returning to a collimated form.

The reference and test beams 22 and 24 emanate from the following diffractive optic as a collimated combined beam 36 containing interfering planar wavefronts that are imaged onto a diffuser plate 38. A resulting interference pattern formed on the diffuser plate 38 represents deviations in the toric test surface 34 from a theoretical toric surface that would produce a null pattern.

The following diffractive optic 30 is adjustable by a conventional positioning system 40 along the reference axis 18 to vary phase differences between the interfering wavefronts at each measured point of the interference pattern. Such phase shifting improves measurement accuracy and relates adjacent measures to each other and the rest of the interferogram. Different increments of phase shift "$\Delta s$" are required for each radial position of the diffractive optic 30, but these can be chosen as any rational fraction between one and two wavelengths of optical path difference "$\delta \lambda$" as shown by the following inequality:

$$\delta \lambda \leq \Delta s \leq 2 \delta \lambda$$

where "$\delta \lambda$" is related to the actual wavelength "$\lambda$" of the reference and test beams 22 and 24 and the diffraction angle "$v$" of the following diffractive optic 30 as follows:

$$\delta \lambda = \frac{\lambda}{\sec v - 1}$$

A zoom lens 44 relays an image of the interferogram from the diffuser plate 38 to an image-recording device, such as a camera 46. The image is sized, usually by demagnification, to best fill the recording area of the camera 46. Within the camera 46, a solid state or charge-coupled device (CCD) preferably records the interference pattern for processing by a computer 48. A display device 50, such as a cathode-ray tube, flat panel device, or printer displays information about the test surface 34 in a useful form. In addition to topographical information, derivable measures such as curvature and roundness can also be displayed. Alternatively, the information could be electronically stored or transmitted for use in other operations, such as feedback to a manufacturing operation.

For test surfaces that are surfaces of revolution such as the toric test surface 34, the leading and following diffractive optics 20 and 30 can be defined by their instantaneous pitch "$P(\mu)$" and "$P(v)$" throughout a range of radial distances "$A(\mu)$" and "$A(v)$" from the reference axis 18. Both sets of variables "$P(\mu)$", "$P(v)$" and "$A(\mu)$", "$A(v)$" are parametrically defined by the respective diffraction angles "$\mu$" and "$v$". For example, the instantaneous pitch "$P(\mu)$" and "$P(v)$" can be defined as follows:

$$P(\mu) = \frac{\lambda}{\sin \mu} \text{ or } P(v) = \frac{\lambda}{\sin v}$$

A convenient starting point for the calculations is on an equator 52 of the test object 32 where the grazing angle "$\theta$", which determines the sensitivity of the measure, is equal to both of the diffraction angles "$\mu$" and "$v$". The corresponding radii "$A(\mu)$" and "$A(v)$" of the diffractive optics for transmitting rays 26 impinging on the equator 52 or elsewhere on the toric test surface 34 can be determined as a function of the respective diffraction angles "$\mu$" and "$v$" as follows:

$$A(\mu) = r - \sigma_1\sigma_2 R(1 - \cos\theta\sec\mu) +$$

$$\sigma_2 \tan\mu \left[ s - t\left(1 - \frac{\cos\mu}{\sqrt{n^2 - \sin^2\mu}}\right)\right]$$

$$A(v) = r - \sigma_1\sigma_2 R(1 - \cos\theta\sec v) + \sigma_2 s \tan v,$$

where "r" is the radius of the test object 32 at its equator 52, "R" is a radius of curvature of the toric test surface 34 in an axial plane that includes the reference axis 18, "s" is a distance from the relevant diffractive optic 20 or 30 to the equator, "t" is the thickness of the transparent plate 28, "n" is the refractive index of the plate 28, and "$\sigma_1$ and $\sigma_2$" are sign conventions. "$\sigma_1$" is equal to +1 for convex test surfaces and −1 for concave test surfaces. "$\sigma_2$" is equal to +1 for outside measurement and −1 for inside measurement.

The individual diffraction angles "$\mu$" and "$v$" for any part on the test surface 34 can be calculated as follows:

$$\mu = \theta + \sin^{-1}\left(\frac{z}{R}\right) \text{ or } v = \theta - \sin^{-1}\left(\frac{z}{R}\right)$$

where "z" is the vertical distance of a point on the test surface 34 from its equator 52. Maximum and minimum values for the diffraction angles "$\mu$" and "$v$" can be calculated by substituting values of "z" that span the full vertical height "H" of the test surface. For example, minimum and maximum diffraction angles "$\mu_{min}$" and "$\mu_{max}$" can be calculated as follows:

$$\mu_{min} = \theta - \sin^{-1}\left(\frac{H}{2R}\right) \text{ and } \mu_{max} = \theta + \sin^{-1}\left(\frac{H}{2R}\right)$$

Wavefronts "$W(\mu)$" and "$W(v)$" emanating to and from the test surface 34 can also be defined as functions of the diffraction angles "$\mu$" and "$v$" as follows:

$$W(\mu) = \frac{\sigma_1\sigma_2}{2} R\cos\theta[\sec\mu\tan\mu - \log(\sec\mu + \tan\mu)] +$$

$$\frac{\sigma_2}{2}(s-t)\sec^2\mu - \frac{\sigma_2 n^2 t \cos\mu}{(n^2-1)\sqrt{n^2-\sin^2\mu}} \text{ or }$$

$$W(v) = \frac{\sigma_1\sigma_2}{2} R\cos\theta[\sec v\tan v - \log(\sec v + \tan v)] + \frac{\sigma_2}{2} s\sec^2 v$$

The pitch "$P(\mu)$", "$P(v)$" and the radii "$A(\mu)$", "$A(v)$" are calculated at each ($\lambda/2$) increment of the wavefront throughout the entire range of measurement.

The diffraction angles "$\mu$" and "$v$" can be eliminated from the above equations by substituting the following relationships:

$$\cos\mu = \frac{r_c A_\mu + sD_\mu}{A_\mu^2 + s^2} \text{ or } \cos v = \frac{r_c A_v + sD_v}{A_v^2 + s^2}$$

where the terms "$r_c$", "$D_\mu$", and "$D_v$" appearing in these equations are related to certain of the previously introduced variables as follows:

$$r_c = R\cos\theta$$

$$D_\mu = \sqrt{A_\mu^2 + s^2 - r_c^2} \text{ or } D_v = \sqrt{A_v^2 + s^2 - r_c^2}$$

With these substitutions, the above wavelength equations can be written as functions of the radii "$A(\mu)$", "$A(v)$", which appear in the following equations as "$A\mu$" and "$Av$":

$$W(A_\mu) = \frac{\sigma_1\sigma_2}{2}\left[D_\mu \frac{(A_\mu^2 + s^2)}{(r_c A_\mu + sD_\mu)} + r_c \log\left(\frac{A_\mu + D_\mu}{r_c + s}\right)\right] -$$

$$\frac{t}{2}\frac{(A_\mu^2 + s^2)^2}{(r_c A_\mu + sD_\mu)^2} -$$

$$\frac{n^2 t(r_c A_\mu + sD_\mu)}{(n^2 - 1)\sqrt{n^2(A_\mu^2+s^2)^2 - (r_c s - A_\mu D_\mu)^2}} \text{ or }$$

$$W(A_v) = \frac{\sigma_1\sigma_2}{2}\left[D_v \frac{(A_v^2 + s^2)}{(r_c A_v + sD_v)} + r_c \log\left(\frac{A_v + D_v}{r_c + s}\right)\right]$$

Figure 4:
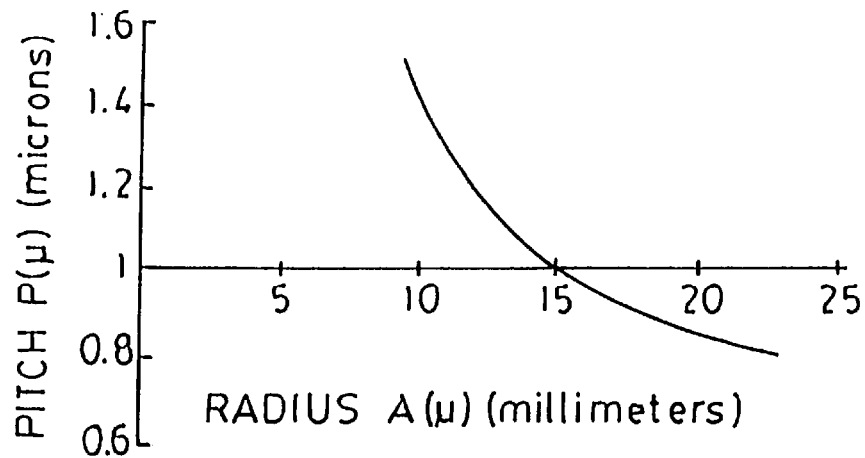
FIG. 4 is a graph relating pitch variations in a diffractive optic to radial distances from the center of the optic.

An example of a variation in pitch "$P(\mu)$" with radius "$A(\mu)$" for measuring a sphere is plotted in FIG. 4. The pitch "$P(\mu)$" decreases with increasing radius "$A(\mu)$" at a non-linear rate.

The equations written in terms of the diffraction angle "$\mu$" differ from those written for the diffraction angle "$v$" by terms that words, without the plate, the equations written for the diffraction angles "$\mu$" and "$v$" would otherwise be the same.

Since both the equatorial radius "r" and the radius of curvature "R" of the test surface 34 contribute to the designs of the diffractive optics 20 and 30, absolute measurements of the toric surface can be made based on an initial calibration. A master toric surface having known dimensions can be mounted in place of the toric test surface 34 to obtain the initial calibration. In the case of spheres, larger or smaller test surfaces would introduce power terms into the measured wavefronts; and these power terms can be extracted using a least squares polynomial fit to yield high accuracy measurements.

The diffractive optics 20 and 30 can be made in a variety of ways including holographically or photolithographically using materials sensitive to light. Also, the individual grooves can be developed by coating the optic with a photoresist and rotating the optic under a closely focused laser beam.

The reference beam 22 is preferably diffracted through a zero diffraction order, and the test beam 24 is preferably diffracted through a first diffraction order. The "duty cycle", which is the percent of the remaining surface between grooves, and "phase shift", which is the groove depth as a percentage of wavelength, can be adjusted to balance energies between the two orders for improving contrast of the interference pattern. Normally, more energy is directed into the first diffraction order (the test beam 24) to compensate for reflection losses from the test surface 34.

The plane parallel plate 28 has a top surface 54 for supporting the test object 32, which conveniently has a flat bottom surface 56 for orienting its central axis 33 into alignment with the reference axis 18. Other test objects may require fixturing mounted on the plate 28 or a second similar plate for securing both ends of the test object. Centering apparatus (not shown) is preferably used for locating the central axis 33 coincident with the reference axis 18. Such centering apparatus as well as other suitable mounting arrangements with transparent plates are disclosed in co-assigned U.S. patent application Ser. No. 08/634,218, filed Apr. 18, 1996, Now U.S. Pat. No. 5,684,594. This application is hereby incorporated by reference.

Phase shifting can also be accomplished in a variety of other ways, all of which involve modulating path length between the reference beam 22 and the test beam 24. For example, the leading diffractive optic 20 could also be adjusted along the reference axis 18 by similar amounts to accomplish phase shifting. Also, the light source 10 could be a tunable wavelength diode laser for varying the wavelength "$\lambda$" from an initial value "$\lambda_o$" through a similar increment "$\Delta\lambda$" within the following range:

$$\Delta\lambda_o \leq \Delta\lambda \leq 2\Delta\lambda_o$$

where the variable "$\Delta\lambda_o$" is determined as follows:

$$\Delta\lambda_o = \frac{\lambda_o^2}{OPD}$$

and where the variable "OPD" is the optical path difference between the test and reference beams 22 and 24. A simplified equation for path length "OPD", discounting the plate 28 and spacing the diffractive optics 20 and 30 at equal distances "s", is as follows:

$$OPD = -2s - 2R\sin\theta + \frac{\sec\mu(2s + R\sin(\mu - \theta) + R\sin(\mu + \theta))}{2} - \frac{\sec\nu(2s - R\sin(\nu - \theta) - R\sin(\nu + \theta))}{2}$$

The remaining drawing figures, FIGS. 5–8, illustrate a variety of other toric surfaces that can be measured in accordance with my invention. Each depicts rays of a test beam as they are propagated between two diffractive optics. The rays pass through a transparent support plate and strike the toric surfaces at a constant grazing angle throughout an annular band on the surfaces.

Figure 5:
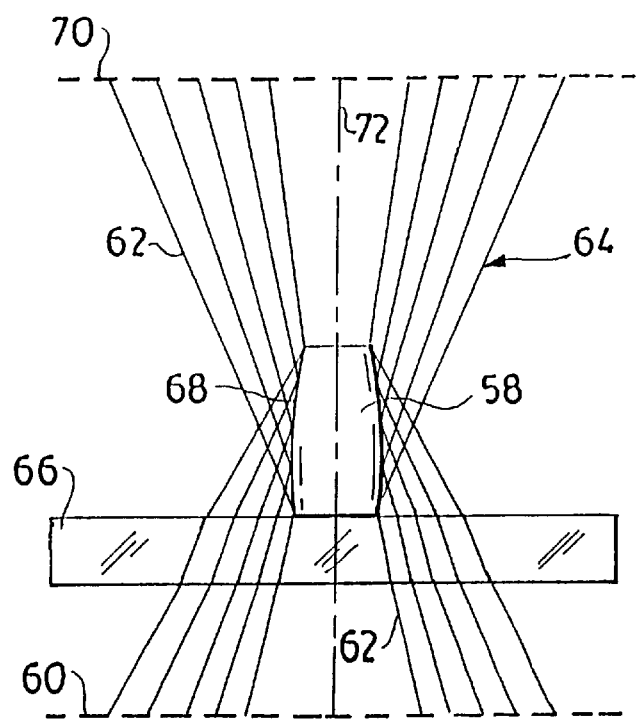
FIG. 5 shows a toric surface of a tapered roller bearing measured by a locus of rays of a test beam shaped by a pair of diffractive optics.

For example, FIG. 5 depicts measurement of a crowned tapered roller bearing 58 in which the amount of crowning is exaggerated for illustration. A leading diffractive optic 60 diffracts rays 62 of a test beam 64 through various diffraction angles so that after passing through a transparent support plate 66, the rays 62 strike over the entire area of toric surface 68 at a constant grazing angle. A following diffractive optic 70 further diffracts the rays through other diffraction angles into directions matching corresponding rays of a reference beam (not shown), such as along a common axis 72 of the two diffractive optics 60 and 70.

Figure 6:
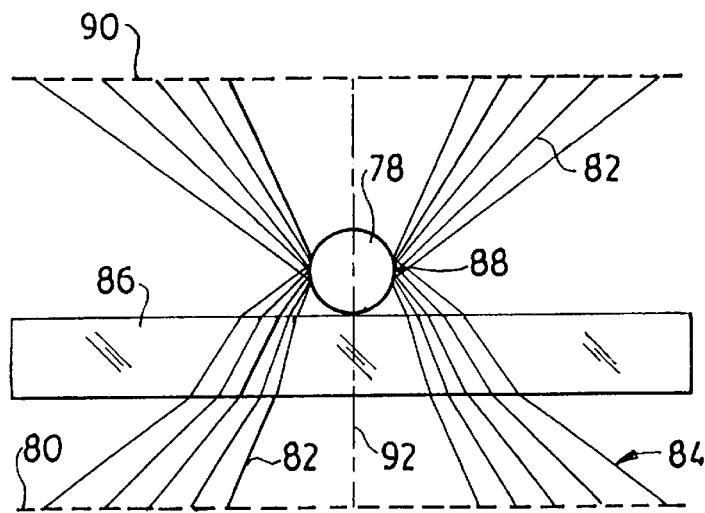
FIG. 6 shows a spherical surface of a ball bearing measured by a locus of rays of a test beam shaped by a different pair of diffractive optics.

A spherical surface 88 of a ball bearing 78 is mounted on a transparent support plate 86 for measurement in FIG. 6. Rays 82 of a test beam 84 are similarly diffracted by leading and following diffractive optics 80 and 90 for traversing the spherical surface 88 at a constant grazing angle before being reoriented into a prescribed direction. Large variations in surface orientation limit the measurement area to an annular band overlapping an equator of the spherical surface 88. About one-half of the spherical surface 88 can be measured this way. A three-point supporting fixture (not shown) is preferably mounted on the plate 86 for centering the sphere along a common reference axis 92 of the two diffractive optics 80 and 90.

Figure 7:
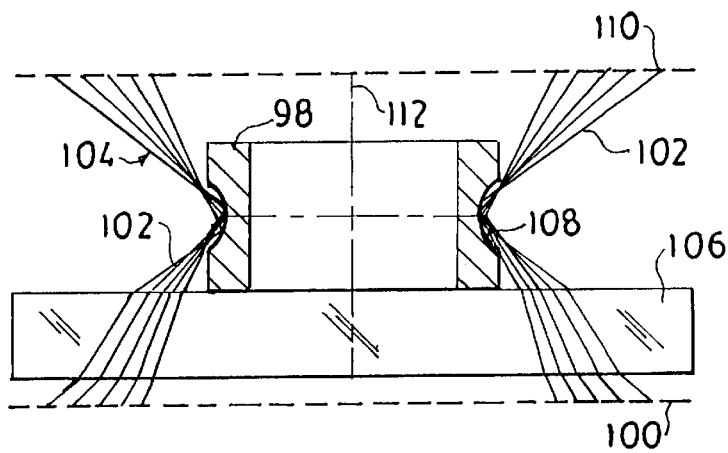
FIG. 7 shows an outer toric surface of an inner bearing race in cross section measured by a locus of rays of a test beam shaped by a another pair of diffractive optics.
Figure 8:
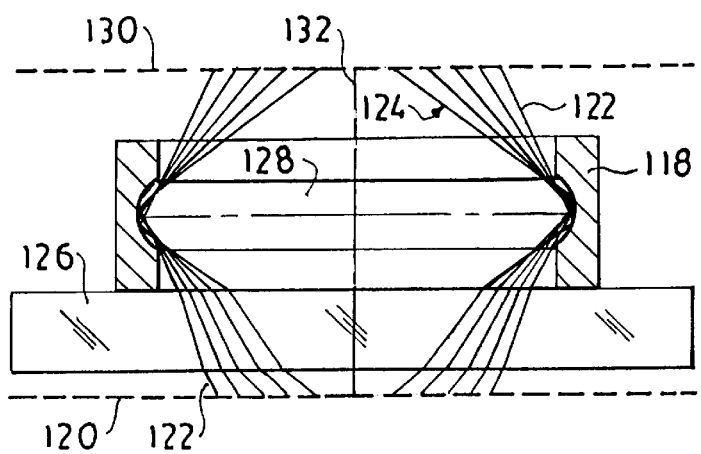
FIG. 8 shows an inner toric surface of an outer bearing race in cross section measured by a locus of rays of a test beam shaped by a yet another pair of diffractive optics.

FIGS. 7 and 8 depict the measurement of inner and outer ball bearing races 98 and 118. In FIG. 7, diffractive optics 100 and 110 diffract rays 102 of test beam 104 out of alignment with a reference axis 112 for striking an annular band of an outer toric surface 108 at a constant grazing angle. The diffractive optic 100 differs from the diffractive optic 110 to compensate for refractions through support plate 106.

An inner toric surface 128 of the outer bearing race 118 is similarly measured by rays 122 of test beam 124 in FIG. 8. Again, diffractive optics 120 and 130 reshape the test beam to measure the toric surface 128 through a support plate 126 at a predetermined grazing angle. However, in comparison to other drawing figures, the rays 122 are diffracted through opposite sign diffraction orders to reach the inner toric surface 128, which faces a reference axis 132 of the two diffractive optics 120 and 130.

The transparent support plates of the preceding embodiments are preferably located between the leading diffractive optic and the toric test surface to simplify phase shift. Alternatively, the transparent support plates could be located between the toric test surface and the following diffractive optic, or the transparent support plates could be located at both ends of the toric test surface. In the former case, the same diffractive optic configuration could be used—only the direction of light travel is reversed.

In my preferred arrangement, the reference beam is transmitted together with the test beam through both the leading and following diffractive optics. However, the reference beam could also be conveyed independently of the diffractive optics and be later recombined with the test beam through a partially reflective and partially transmissive surface. The following diffractive optic could also be made with a reflective surface for returning the test and reference beams along a common path.

I claim:

1. A method of measuring a toric surface comprising the steps of:

dividing a primary beam into test and reference beams;

diffracting a test beam with respect to a reference beam with a first diffractive optic through a range of diffraction angles that varies with a radius of the first diffractive optic;

illuminating an annular measurement band on the toric surface with the test beam so that the test beam is incident to the toric surface at a constant grazing angle throughout the annular measurement band;

rediffracting a test beam with respect to a reference beam with a second diffractive optic through a different range of diffraction angles that varies with a radius of the second diffractive optic; and recombining the test and reference beams producing an interference pattern indicative of variations in the toric surface from a null condition.

2. The method of claim 1 including the further steps of supporting the toric surface with a transparent plate and transmitting the test beam through the transparent plate.

3. The method of claim 2 in which the toric surface includes a central axis and refraction through the transparent plate offsets portions of the test beam radially of the central axis by amounts that vary with the diffraction angles of one of the diffractive optics.

4. The method of claim 3 in which said step of adjusting includes adjusting the diffraction angles of the first diffractive optic to compensate for refractions through the transparent plate.

5. The method of claim 1 in which the toric surface includes a central axis and the first and second diffractive optics include respective axes, and including the further step of aligning the central axis of the toric surface with the axis of the second diffractive optic.

6. The method of claim 5 including the further step of shifting one of the first and second diffractive optics along its axis to accomplish phase shifting.

7. The method of claim 6 including the further step of shifting the second diffractive optic along its axis to accomplish phase shifting.

8. The method of claim 6 in which different increments of phase shift are required for each different diffraction angle through which the test beam is diffracted.

9. The method of claim 1 including the further step of varying a wavelength of the primary beam to accomplish phase shifting.

* * * * *